United States Patent
Famouri et al.

(10) Patent No.: US 11,746,691 B2
(45) Date of Patent: Sep. 5, 2023

(54) OPPOSING PISTON SYNCHRONIZED LINEAR ENGINE-ALTERNATOR (OPSLEA) FOR ELECTRICAL POWER GENERATION

(71) Applicants: Parviz Famouri, Morgantown, WV (US); Jayaram Subramanian, Morgantown, WV (US); Terence Musho, Bruceton Mills, WV (US); Ramanjaneya Mehar Baba Bade, Morgantown, WV (US); Fereshteh Mahmudzadeh Ghomi, Morgantown, WV (US)

(72) Inventors: Parviz Famouri, Morgantown, WV (US); Jayaram Subramanian, Morgantown, WV (US); Terence Musho, Bruceton Mills, WV (US); Ramanjaneya Mehar Baba Bade, Morgantown, WV (US); Fereshteh Mahmudzadeh Ghomi, Morgantown, WV (US)

(*) Notice: Subject to any disclaimer, the term of this patent is extended or adjusted under 35 U.S.C. 154(b) by 0 days.

(21) Appl. No.: 17/527,540

(22) Filed: Nov. 16, 2021

(65) Prior Publication Data
US 2022/0154634 A1    May 19, 2022

Related U.S. Application Data

(60) Provisional application No. 63/114,228, filed on Nov. 16, 2020.

(51) Int. Cl.
F02B 63/04       (2006.01)
F02B 75/02       (2006.01)
(Continued)

(52) U.S. Cl.
CPC ............ *F02B 63/041* (2013.01); *F02B 71/04* (2013.01); *F02B 75/02* (2013.01); *H02K 7/1884* (2013.01); *F02B 2075/025* (2013.01)

(58) Field of Classification Search
CPC ........ F02B 63/041; F02B 71/04; F02B 75/02; F02B 2075/025; H02K 7/1884; H02K 33/18; H02K 33/02
See application file for complete search history.

(56) References Cited

U.S. PATENT DOCUMENTS

| | | | |
|---|---|---|---|
| 2005/0109295 A1* | 5/2005 | Kaneko | F02B 71/04 123/46 E |
| 2012/0112468 A1* | 5/2012 | Najt | F01B 11/007 290/1 A |
| 2021/0013786 A1* | 1/2021 | Famouri | H02K 33/02 |

* cited by examiner

*Primary Examiner* — Syed O Hasan
(74) *Attorney, Agent, or Firm* — Thomas | Horstemeyer, LLP

(57) ABSTRACT

Various examples are provided related to opposing piston synchronized linear machines. In one example, among others, an opposed piston synchronized linear machine includes a linear engine having opposed piston assemblies including two pistons that move linearly in opposite directions along a longitudinal axis of a central cylinder; first and second linear electromagnetic machines coupled at a proximal end to the piston assemblies; and a resonant driver assembly that provides compression during a compression stroke of the linear engine. The first and second linear electromagnetic machines can convert linear motion provided by the two pistons to electrical energy in a generating mode. The opposed piston assemblies can be synchronously controlled to generate a compression ratio sufficient to combust fuel in a combustion chamber of the central cylinder.

16 Claims, 4 Drawing Sheets

(51) Int. Cl.
*F02B 71/04* (2006.01)
*H02K 7/18* (2006.01)

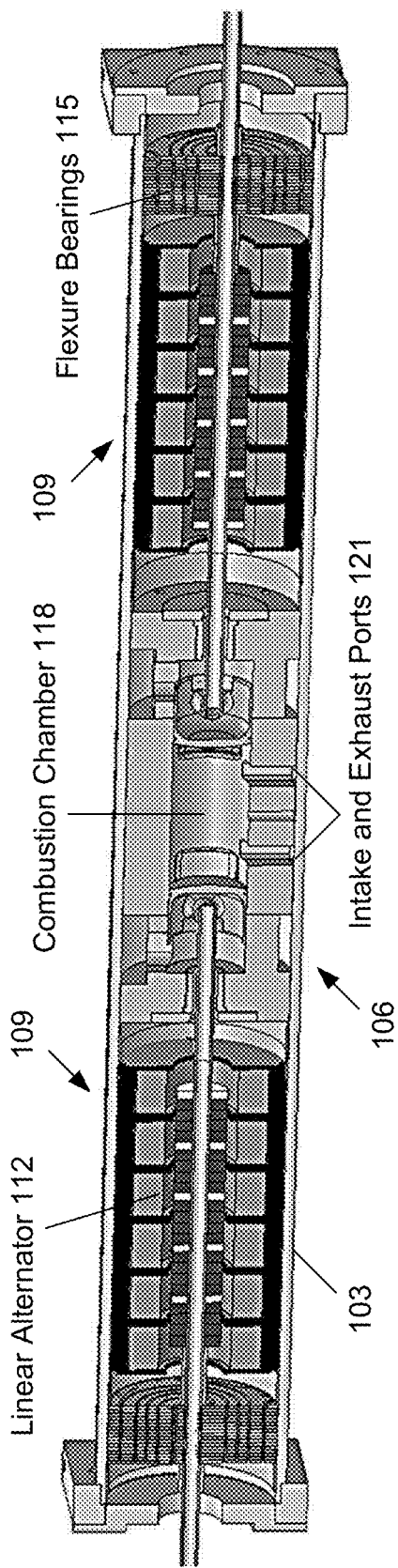
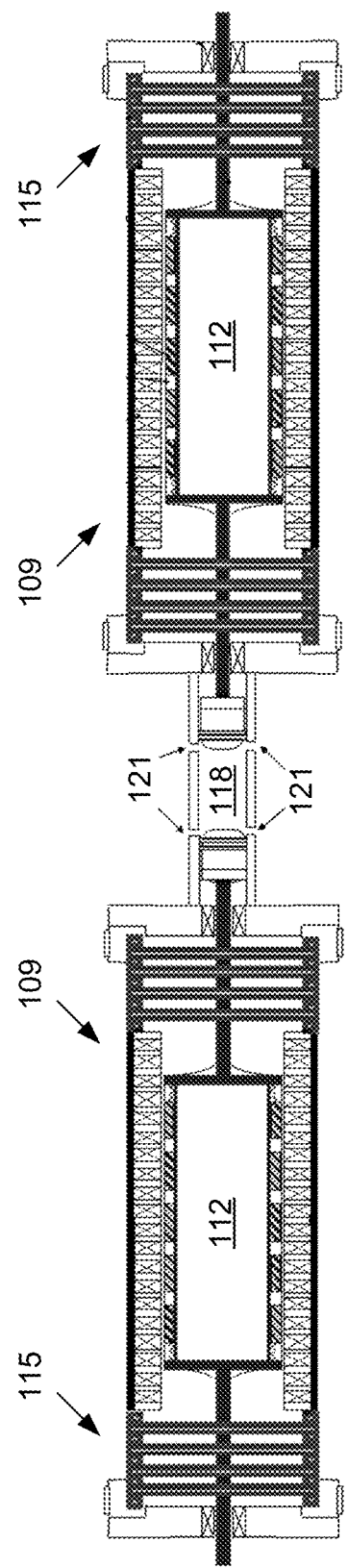
FIG. 1A
FIG. 1B

Radially Magnetized    Axially Magnetized

FIG. 4A — Archimedes Spiral
FIG. 4B — Oxford Spiral

Outer Rim/Spacer
Spiral Cut Flexure Diaphragm
Inner Rim/Spacer

OPPOSING PISTON SYNCHRONIZED LINEAR ENGINE-ALTERNATOR (OPSLEA) FOR ELECTRICAL POWER GENERATION

CROSS REFERENCE TO RELATED APPLICATIONS

This application claims priority to, and the benefit of, U.S. provisional application entitled "Opposing Piston Synchronized Linear Engine-Alternator (OPSLEA) for Electrical Power Generation" having Ser. No. 63/114,228, filed Nov. 16, 2020, which is hereby incorporated by reference in its entirety.

BACKGROUND

Existing designs of integrated electromagnetic generators, for example, rotary turbines have proven to be reliable, simple in operation, and offer high power density, however they are inefficient and expensive to manufacture and maintain. While crankshaft engines driven electromagnetic generators offer better efficient at small scales, they lack simplicity and have a low power density. Therefore, a need exists to develop a reliable, inexpensive, high energy density, high efficiency electromagnetic generator.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views.

FIGS. 1A-1C are cross-sectional views illustrating examples of opposed piston synchronized linear engine-alternators (OPSLEA), in accordance with various embodiments of the present disclosure.

FIGS. 4A-4D illustrate examples of flexure springs of flexure bearings, in accordance with various embodiments of the present disclosure.

DETAILED DESCRIPTION

Figure 1C:
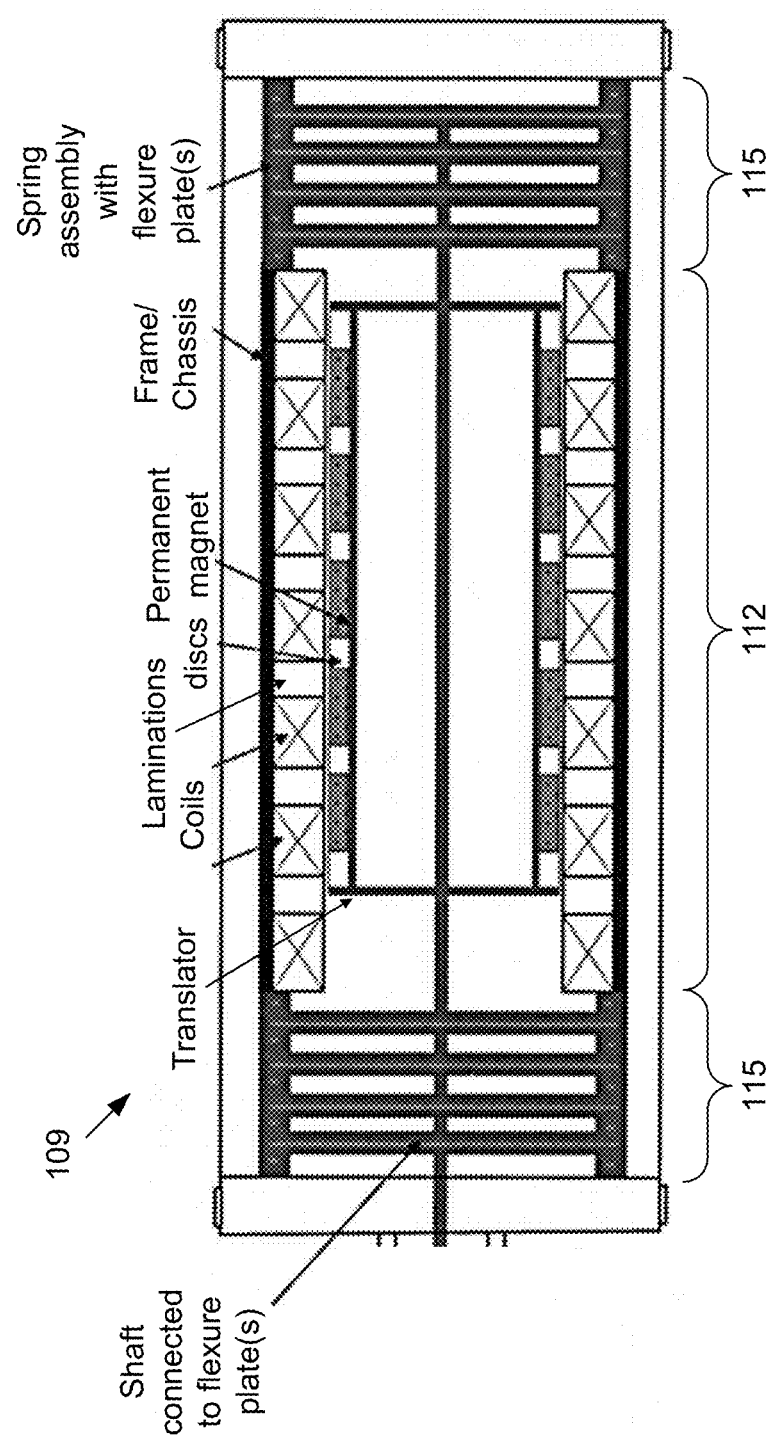

Disclosed herein are various examples related to opposing piston synchronized linear machines. One solution discussed within comprises an integrated resonant free piston engine generator system with high power density that offers the advantages of integrated electromagnetic generator over rotary turbine systems and conventional crankshaft engine systems. Various aspects are directed towards resonant free piston linear engine generators, and more specifically, representations associated with opposed free piston linear engine generators capable of achieving high frequencies, variable compression ratios and high efficiencies by combining the innovative resonant system design, linear sensing and combustion control techniques. A novel resonant free piston engine generator system has been developed utilizing the potential advantages of both integrated electromagnetic generator—rotary turbine systems and conventional crankshaft engine systems. The resonant opposed free piston engine generators can comprise a pair of engine cylinder and piston assembly systems, a pair of resonant mechanisms and a pair of electromagnetic resonant machine systems. Translator sections can move cyclically on both sides of the opposing piston assembly through a substantially linear stroke relative to dual stator assemblies. The efficiency of the integrated resonant free piston engine generator system can be improved over 55% with operating frequencies ranging from 10 Hz to 120 Hz for distributed electric generation systems, combined heat and power applications and hybrid electric vehicles ranging from 0.5 kW to 10 MW. Reference will now be made in detail to the description of the embodiments as illustrated in the drawings, wherein like reference numbers indicate like parts throughout the several views.

Linear engines, when coupled with linear alternators, offer an attractive system for electric generation and avoid the translation of linear motion into rotary motion. In the disclosure, a resonant opposed free piston engine generator design comprising an engine cylinder with a pair of opposed pistons and piston assemblies to provide combustion work or kinetic energy to the reciprocating pistons. Each piston assembly can comprise a piston, one or two piston rings, a translator rod moving linearly within the cylinder, a gudgeon or wrist pin that can attach the piston to a translator rod.

A pair of novel resonant systems, which act as the driver system during the compression stroke and enable high frequency operation, and a pair of linear electromagnetic resonant machines can generate electrical energy from the kinetic energy of the reciprocating pistons during the power generation mode. The pair of linear electromagnetic resonant machines can also provide the desired electrical work for reciprocating the piston assemblies during the starting or motoring mode. The integrated engine generator system can achieve a variable compression ratio and variable expansion ratio. In some embodiments, the variable compression ratio during the compression stroke can be controlled in such that it is either greater than or less than or equal to the variable expansion ratio during the power stroke.

The resonant systems can comprise specially designed mechanical flexure springs or compression springs including but not limited to helical coil design, disc springs and Belleville washer springs and/or gas springs where the volume of the gas is compressed and expanded continuously to enable mechanical resonance. In some configurations, the resonant system can comprise a combination or union of multiple designs defined above. In some embodiments, the resonant system can be mounted either at the far end or the central section or the internal section of the integrated engine generator system. The electromagnetic machine can be a permanent magnetic, induction or switched reluctance machine or a combination of these machines. In some configurations, the stator and translating section can be interchanged depending upon the configurations. The linear electromagnetic machine can be either flat design or tubular design, or single phase or three phase or a combination of all these designs.

In some embodiments, the engine cylinders can be operated on a two-stroke combustion cycle. In a two-stroke combustion cycle, the entire engine cycle is finished in two strokes namely compression and induction stroke and power and exhaust discharge stroke. In a two-stroke combustion cycle, there is a power stroke for every cycle of operation. In the compression and induction strokes, the fuel and air mixture or air is inducted into the combustion section of the combustion chamber and the gas contents are compressed by means of the driver systems. The fuel and air mixture or the air is inducted into the combustion section through, e.g., ports or valves mounted on the cylinder. The fuel and air mixture can be directly introduced into the combustion chamber or can be introduced into an additional cylinder which acts as a virtual crankcase thereby enabling crankcase compression. The flow of the air and fuel mixture from the virtual crankcase to the combustion section of the cylinder and the emptying of the exhaust products from the combustion chamber is termed as the scavenging process.

The porting configuration can employ, e.g., a loop scavenging method, crossflow scavenging mechanism or uniflow scavenging mechanism. In a uniflow scavenging design, the intake fuel and air mixture is introduced into the combustion chamber from the bottom of the combustion chamber and the intake flow pushes out the exhaust products from the exhaust value located at the top of the combustion chamber. The exhaust products comprise combustion end products or combustion end products with the air mixture or the fuel and air mixture or a combination of all these products. In this uniflow scavenging design, the intake fuel and air mixture and the exhaust products move in the same direction (from the bottom of the combustion chamber to the top of the combustion chamber).

In a crossflow scavenging design, the intake and exhaust port are located at the same location on the combustion chamber but are located at the opposite sides of the combustion chamber. The crossflow of the intake fuel and air mixture is directed upwards in a vertical loop using a specially designed piston and the exhaust products are pushed out using the crossflow of the intake mixture. In a loop scavenging design, the intake and exhaust gases are introduced using two different horizontal loops and both the intake and exhaust ports are located on the same side of the combustion chamber but are mounted at different locations along the cylinder liner. For example, the intake ports can be located at the bottom of the cylinder liner while the exhaust ports can be located slightly above the intake port. The intake fuel and air mixture flowing into the combustion chamber forms the loop by means of piston crown and pushes out the exhaust contents from the combustion chamber by using an exhaust port.

The fuel can be fumigated into the intake port or can be injected into the intake port or can be injected directly into the cylinder by using a fuel injector. The fuel can be either liquid or gaseous and the engine can be operated using stoichiometric, lean, ultra-lean or rich operating conditions. Moreover, ports and valves can also be provided for the driver sections with a gas spring design for the discharge and the makeup of the driver gas for compressing the combustion chamber gas contents during the compression stroke. During the power or expansion and exhaust discharge stroke, the combustion energy or the kinetic energy is delivered to the piston assembly during the initial phase and the exhaust contents are discharged from the combustion chamber. During this stroke, a portion of the combustion or kinetic energy delivered to the piston is converted into electricity by using a linear electromagnetic machine and some portion of the combustion or kinetic energy is provided as an input for the resonant system for driving the compression stroke of the upcoming cycle and overcoming the vibration and frictional losses.

In some embodiments, the engine cylinders can be operated on a four-stroke combustion cycle. In a four-stroke combustion cycle, the entire engine cycle is finished in four strokes namely intake stroke, compression stroke, power or expansion stroke and an exhaust stroke. In a four-stroke combustion cycle, there is a power stroke for every two cycles of operation. In the intake stroke, the fuel and air mixture or air is inducted into the combustion section of the combustion chamber. The fuel and air mixture or the air is inducted into the combustion section through ports or values mounted on the cylinder. The fuel and air mixture can be directly introduced into the combustion chamber or can be introduced into an additional cylinder which acts as a virtual crankcase thereby enabling crankcase compression.

The fuel can be fumigated into the intake port or can be injected into the intake port or can be injected directly into the cylinder by using a fuel injector. The fuel can be either liquid or gaseous and the engine can be operated using stoichiometric, lean, ultra-lean or rich operating conditions. During the compression stroke, the intake fuel and air mixture or the air can be compressed using the resonant driver mechanism. During the power or expansion stroke, the combustion energy or the kinetic energy is delivered to the piston assembly. During this stroke, a portion of the combustion or kinetic energy delivered to the piston can be converted into electricity using a linear electromagnetic machine and some portion of the combustion or kinetic energy can be provided as an input for the resonant system for driving the three non-powering strokes of the upcoming cycle. During the exhaust stroke, the combustion products are pushed out from the combustion chamber during the entire stroke.

The ignition of the fuel and air mixture can be achieved either by means of spark ignition, compression ignition or homogenous charge compression ignition systems. In a spark ignited system, the fuel and air mixture is compressed below its auto-ignition limit and the fuel and air mixture is ignited by using a spark signal from a spark plug. In a compression ignition system, the air mixture is compressed and the temperature and the heat from air mixture is moderated in such a way that the fuel injected at the end of the compression stroke is ignited by means of heat from the air mixture. In a homogenous charge compression ignition (HCCI) system, a homogeneous or well mixed air and fuel mixture is compressed until the auto-ignition conditions are reached as a result the mixture is ignited spontaneously on its own without any assistance of the spark signal.

One aspect of the linear engine system is use of position information of the engine. High accuracy and high-speed position information can be utilized to make control decisions in the order of µs. In order to achieve accurate control, the position information accuracy should be in the order of µm. This can be done with the usage of linear sensing technology such as, e.g., hall-effect encoders or through self-sensing technology. For an opposed piston engine, the control system controls two identical linear electromagnetic machines and one engine. The electromagnetic machines can be synchronized by the control system to reach the same stroke length at the same time. An opposed piston configuration or similar strategy can be employed for other engine configurations such as single cylinder and back-to-back cylinder configurations.

To start the system, a unique startup procedure can be followed by stable operation of the engine. To perform that, the linear electromagnetic machine is started as a motor. The motor is oscillated for a few cycles before the engine can start running. The ease of starting the motor to run for a few cycles is made possible because of the spring resonance system. If the machine is started at the resonant frequency, significantly less power is needed to start the motor to reach its maximum displacement. A phase locked loop method can be employed to detect and lock the resonant frequency of the system to operate the engine at resonance.

To achieve this operation, the electromagnetic machine can be started with an open loop control system. An open loop starting procedure initiates the reciprocation motion and provides the position information. This can be done by providing a pair of pulses with a specified duty cycle in one direction. The pulses are identical and are provided at the same time to perform synchronization. However, the voltage provided to the linear electromagnetic machine is in opposite directions to produce back-to-back motion of the system. Once the position information is known, the resonant frequency can be calculated and locked in using the phase locked loop (PLL) method. Using PLL, a pair of pulses at resonant frequency can be sent to drive the linear electromagnetic machines.

To synchronize the two machines, one of the two machines can be operated as the master machine with the other machine operated as the slave machine. Position information from the master machine can be used to determine the resonant frequency. This is used to drive the two pulses in synchronism for both the master and slave machine. Once the motoring is started using synchronism and PLL, the machine will run for few cycles.

Once an operational compression ratio is reached, combustion can start. The combustion can be, e.g., spark ignited or through HCCI. Once the combustion starts, the control can move from the motoring mode to a generating mode. Throughout the generating mode, a similar synchronization can be performed for engine performance signals. The demanded engine control signals can be supplied to the engine from the controller according to the position signal. Moreover, the demanded pair of engine control signals can be in a synchronized manner.

The operation-process can start with the two resonant electric machines (REM) operating as two linear oscillatory motors. Both motors can run on a battery through two power electronics converters (inverters.) The inverter frequency can be increased to reach the resonant frequency of the machine. The resonant frequency of the opposed piston synchronized linear engine-alternator (OPSLEA) system (including the two REMs, springs and the engine) is set by the moving mass and effective spring stiffness of the system. The moving mass includes the translator of the REM machine, moving mass of the springs and the mass of the piston in the engine.

A control algorithm can be used for both starting the engine as explained earlier as well as running the engine at different loads. A phase locked loop (PLL) algorithm can be used to lock the phases of the two pistons' positions with 180 degrees apart. This ensures that the pistons approach one another precisely to control the combustion chamber volume. At the same time, inverter voltages can also be increased. As the frequency and voltage increase the pistons' displacements increase, therefore the compression ratio (CR) in the combustion chamber increases. Once the volume reaches the CR appropriate for combustion, an air/fuel mixture can be injected into the chamber with appropriate timing to ignite the mixture so that combustion occurs. As the system oscillates by combustion in the cylinder, electric output power can be increased. As electric output power is increased, the air/fuel mixture is increased, e.g., through a look-up table or through a control algorithm based upon a mathematical relationship or equation. The control algorithm may evaluate the time derivative of the position signal to determine the velocity at run time. For example, a quadrature linear encoder (e.g., a hall-effect or optical sensor) with high accuracy can be used to achieve the control resolution. Intelligent controls can be utilized.

The disclosed opposed piston synchronized linear engine-alternators (OPSLEA) can be utilized for a wide range of applications such as, e.g., nanogrid electric generation that will be efficient and reliable with fast dynamic response. By avoiding linear to rotary motion, the OPSLEA offers a pathway to efficiency usually associated with far larger engines. A fuel such as natural gas, available in many homes, can be used with high combustion efficiency and oxidation catalysis. Integration of the OPSLEA and proven battery storage components, communication platforms and interface standards can mitigate risk and control cost and can provide for integrated use of local solar or central fossil power. The resulting integrated system can support many different types of loads; including residential loads.

FIG. 1A illustrates a cross-sectional view of an example of an OPSLEA. The OPSLEA can comprise a single cylinder 103 with free opposed pistons, two-stroke engine 106 connected to two synchronized permanent-magnet linear electric generators 109 with linear alternators 112. Specially designed flexure bearings 115 inside the synchronized electric generators (alternators) 109 can act as springs that drive the system during the compression stroke and enable high frequency operation for high power/energy density. The alternators can convert the kinetic energy of the linear opposed pistons during power generation to electrical energy while also providing the electrical power needed for synchronizing the piston assemblies during the starting or motoring mode. The engine can utilize natural gas as fuel supplied to a combustion chamber 118 via intake and exhaust ports 121. The advantage of a two-stroke OPSLEA includes better fuel efficiency and power density when compared to four-stroke engines. This efficiency may be enhanced through advanced combustion strategies, resonance for scavenging, and operation at optimum speed and load. A global control architecture can be configured to individually control the engine combustion, the synchronized systems, and the load characteristics.

FIG. 1B illustrates another example of a two-stroke OPSLEA including flexure bearings 115 on both sides of the electric generator 109. Linear engines have high mechanical efficiency because of the elimination of losses in the rod and crank bearings and decreased radial forces on the piston. Flexure bearings can act as springs to increase the frequency, efficiency, and power density, and also stabilize the operation.

Referring to FIG. 10, shown is a cross-sectional view of an example of a OPSLEA including flexure bearings 115 having a set of flexure springs designed for resonant operation as discussed above, and a linear alternator 112 with an electrical stator winding and a permanent magnet translator supported by the flexure bearings 115. As can be seen in FIG. 10, the permanent magnets of the translator are supported by a frame mounted on the shaft. The frame can be open to reduce wind resistance when oscillating. The alternator can employ an air core or can include an iron core to enhance the magnetic characteristics. The iron core adds mass to the LEA. The mass of the translator can be adjusted by including additional supports and/or plates. Permanent magnets of the translator are surrounded by the coils of the electrical stator winding, which are supported by a structure that is rigid with the chassis, or stator assembly. While not illustrated in FIG. 10, the piston of engine 106 can be coupled to the shaft for driving the linear alternator 112. The piston(s) run in one or more engine cylinder(s) that are attached rigidly to the chassis or stator assembly. In addition to the flexure bearings, resonant operation of the system is also influenced by the design of the generator and the engine. The resonant operation can preserve operation through stumble, engine misfire, or brief loss of electrical supply or load connection.

The motion of two opposed pistons can be synchronized electronically by the two linear electric machines using phase lock loop (PLL), where the opposed motion will reduce vibration and associated losses. Furthermore, heat losses are reduced in an opposed piston engine (OPE) due to the increased stroke to bore ratio relative to a single piston in conventional 2 or 4 stroke engines. Moreover, the absence of the cylinder head improves the overall thermal efficiency. The OPSLEA design can realize high efficiency and low $NO_x$ and particulate emissions, through stoichiometric operation with direct in-cylinder gas injection, uniflow scavenging, and light exhaust gas recirculation to trim output power to match alternator demand.

The OPSLEA designs of FIGS. 1A and 1B utilize two alternators and horizontally opposed pistons running in the same bore and sharing a common combustion chamber. The pistons move inwardly at the same time to conceal intake and exhaust ports and establish compression. This reduces vibration, enables uniflow scavenging in two-stroke mode, and avoids heat loss to the head. Scavenging is possible with either synchronous or asynchronous piston motion. Two-stroke engines can employ uniflow scavenging through use of valves in the head.

Fuel such as, e.g., natural gas can be injected directly through the cylinder wall with a co-located high energy ignition to suit. The pistons can have two functions beyond sealing the combustion chamber. They serve to control the timing of the opening of exhaust and intake ports. Also, they can serve as linear bearings for one end of each of the translator rods that carry the alternators as illustrated in FIG. 1A. The other radial constraint can be provided by flexure bearings on the opposite ends of each translator rod. Modeling can be used to support the placement of ports and estimation of retained exhaust gas. A resonant exhaust system can be used to enhance scavenging and power density, including the use of resonant exhaust and intake. Intake options include, e.g., volume compression in a separate chamber with supercharging opportunity, addition of turbocharging, and purely resonant operation with an electrically driven startup strategy. A piezoelectric subsystem can be used for piston and ring lubrication.

Emissions can be reduced through operation at a stoichiometric ratio, with provision for three-way catalyst cleanup. Fugitive methane may be minimized as a result of the uniflow scavenging. Since the engine can be designed for very high efficiency, and for unthrottled operation in a very narrow band of speed and load, the exhaust temperature can be sufficiently high to oxidize the remaining methane, which is difficult to remove at light loads. The single operating point can be enabled by the fact that the engine will drive alternators that feed direct demand and a battery storage system, allowing for full power delivery with intermittent operation. Battery efficiency can be high and compensate for the substantially reduced part load efficiency of spark ignited engines.

The flexure springs on the translator are the primary agents that dictate the frequency and stroke of the system. This in turn sets engine compression ratio for defined static translator positions. The stroke can be controlled by varying the energy stored in the springs. By providing the translator rod with more thrust than the alternators absorb, the stroke can be made to grow, and vice versa. In this way there is control over the stroke length. During steady state operation, subtle control of engine output via exhaust gas recirculation (EGR) can provide a constant stroke. Therefore, the engine can be designed to provide slightly more thrust than is needed when no EGR is used. This offers a margin for control.

Following assembly and interaction with the alternator, the effects of scavenging pressures, injection timing, ignition timing, and possible external EGR control to optimize operation can be determined. A neural network model for the engine response may be beneficial for the engine control strategy.

The linear alternators for the twin free piston OPSLEA engine system can be, e.g., tubular permanent magnet brushless dc machine type. A tubular permanent magnet linear alternator (TPMLA) offers high-power density and high efficiency. The TPMLA comprises a stator and a translator (similar to a rotor in a rotary electric machine). The moving part of the machine can be windings (coils) instead of permanent magnets. However, the moving coil linear machine will have higher moving mass compared to moving permanent magnet linear machines. Furthermore, moving coil design must have brushes which is inefficient and need to be maintained. For a free piston engine system, TPMLA will have a stator made of windings and a translator made of magnets. Beside TPMLA, there are single sided and double sided.

Permanent magnets such as, e.g., rare-earth NdFeB magnets can be used for the TPMLA translator. The stator can comprise square type copper windings for high packing factor. HF-10 type steel laminations will be used for stator iron core for high efficiency and reasonable cost.

Figure 2:
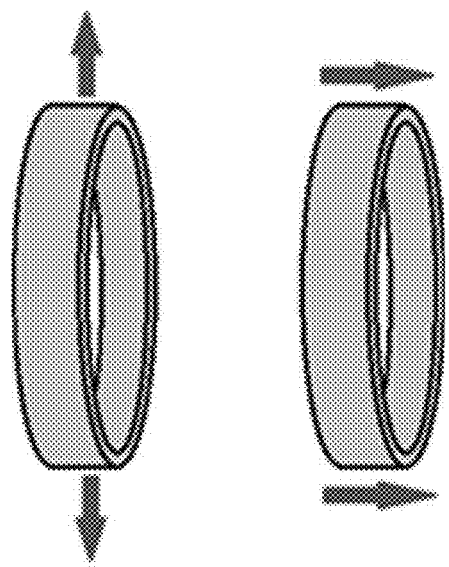
FIG. 2 illustrates an example of magnetization orientation of the magnets of a linear alternator, in accordance with various embodiments of the present disclosure.

Translator: In general, high-energy product rare earth permanent magnets can be used in a TPMLA system. They have large remnant flux densities $B_r$ and large coercive forces $H_c$. The translator can be made of NdFeB magnets because of its high remnant flux density and coercive force compared to Samarium Cobalt magnets. The magnetization orientation of the magnets can be axial or radial as shown in FIG. 2. Of these two orientations, axial magnets will be used. Off the shelf ring magnets can be used for the design and finite element modeling can be done to determine the dimensions of the magnet.

Stator: Stator of the PMLA system can be an iron core machine. The stator can comprise copper windings with the geometric dimensions of the windings based on calculations of "Permanent-magnet linear alternators part 1: Fundamental equations" by I. Boldea and S. A. Nasar (*IEEE Trans. on Aerospace and Electronic Systems*, vol. 23, no. 1, pp. 73-78, 1987). Wire size of the winding can depend on the current flowing in the winding. For a 1 kW PMLA system, AWG 13 can be used to handle currents about 15 A. Since the machine includes an iron core, steel laminations can be used. Silicasteel or type M15/M19/Steel 1010 can be used for the lamination. Steel laminations are used instead of a steel tube to reduce eddy currents.

Finite element modeling of the PMLA can be done using ANSYS to determine the overall dimensions of the alternator. Simple model of the PMLA system in ANSYS is shown below. The translator poles of TPMLA can be higher or lower than the stator poles. Since one parameter in an opposed piston engine is the moving mass of the linear alternator, translator weight and hence the number of poles become important. It can be shown that the short translator provides better performance and design attributes compared to a short stator for FPE applications. Therefore, for the design of the linear alternator, the number of rotor/translator poles will be less than the stator. Since the rotor poles are lesser than the stator poles, only the windings overlapping the translator poles will be useful when the TPMLA is in operation.

Figure 3:
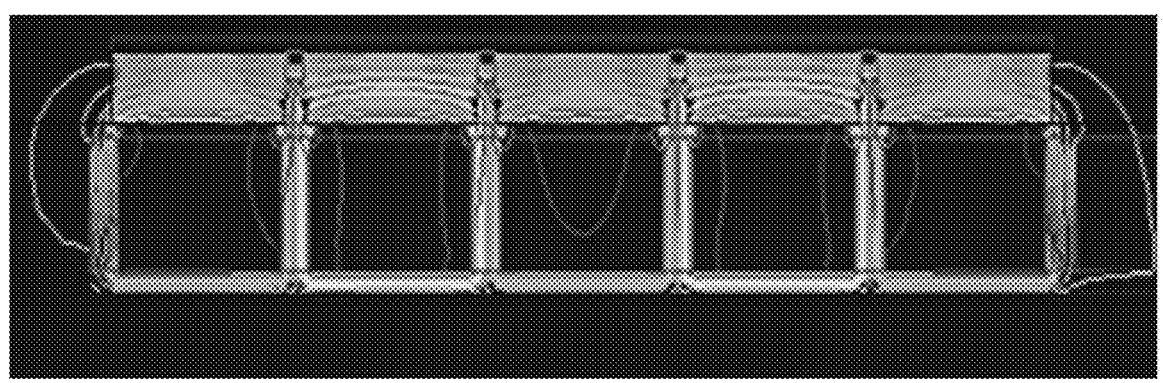
FIG. 3 is a plot illustrating an example of flux density of a linear alternator, in accordance with various embodiments of the present disclosure.

Design parameters of the linear alternator include, e.g., coil height, coil width, back iron stator dimensions, lamination dimensions, magnet thickness, air gap, frequency, number of poles, outer diameter of magnet, number of turns, spacer dimensions, wire gauge, number of phases and magnet arrangement. Dimensions of the magnet can be chosen using available off the shelf magnets for low cost. An example of a finite element simulation for an OLEA design is shown FIG. 3. The desired airgap flux density can in the range of average magnetic flux density of 1.0-1.2 T.

The linear alternator design parameters can be determined based on off the shelf magnets. There are several electrical and geometric parameters which affect the performance of the linear alternator. Some of the parameters that can be optimized include magnet design, outer diameter of the translator, spacer width within magnets and the number of poles. If the magnet and coil design is optimized, higher power density and higher efficiency can be achieved for the alternator. Design of the linear alternator is flexible to accommodate different stroke lengths or frequencies of the engine. Therefore, initially the stroke length and frequency of the whole system can be defined by the engine and the springs. Once the stroke length and frequency are known, the linear alternator can be designed. With a finite element model available and understanding of the linear alternator design principles, different optimization techniques (GA/particle Swarm) can be employed to produce the best possible design of the linear alternator.

Figure 4C:
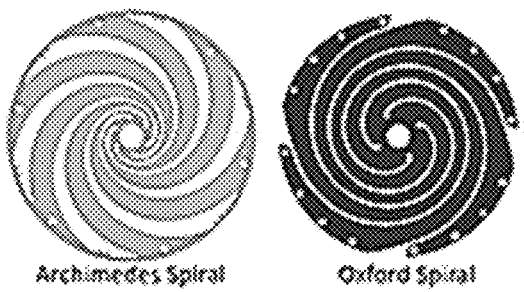
Figure 4C:
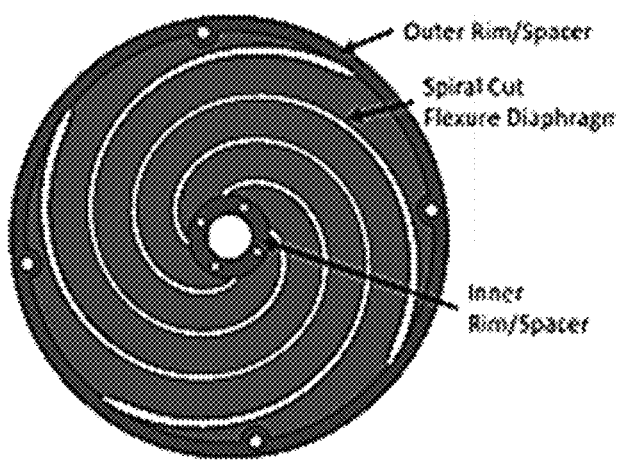

Flexure Bearings: One aspect of the proposed design is the incorporation of a spring in the flexure bearing design. The type of spring can be a flexure or planar springs design. FIGS. 4A-4D illustrate examples of various flexure designs. For example, FIG. 4A illustrates an Archimedes spiral and FIG. 4B illustrates an Oxford spiral. FIG. 4C illustrates the relationship between the outer rim or spacer, the spiral cut flexure diaphragm and the inner rim or spacer. The arm design and material selection govern the frequency response, force response and losses. The outer and inner spacers can also contribute to stresses and losses. In this design the springs can serve three purposes, 1) they increase the frequency of operation (machine resonance), 2) they provide stability to the engine operation (mitigating misfires), and 3) they provide radial support (act as bearing). Because the machine is operated as a resonant machine the design of the flexures directly influences the operation. However, several design objectives are simultaneously considered. In general, the stiffness should be maximized, mass minimized, and losses minimized while designing for infinite lifetime operation. Therefore, one aspect of the design of the flexure bearings is understanding the fatigue strength of available materials and strategies to improve the lifetime of these flexures. The design process of flexures can utilize finite element analysis (FEA) to assess the stresses in design process.

Flexure Loss Mechanisms: An aspect of the flexure design is how the flexures are supported. As seen in FIG. 4C. The flexure plates can be held at the inner and outer diameter using a spacer with through bolts that hold the flexures as a pack. The supports can mitigate the stress and losses. An assumption of infinitely stiff supports will lead to over-evaluation of the stored energy within the flexures. This has been seen in previous experimental studies, where the frequency from the FEA predictions were slightly higher than what was realized in the experiment.

The losses associated with flexures can be associated with windage losses, material damping losses, and/or vibrational losses of the whole machine. However, testing individual springs has shown that there are fundamental losses associated with the material. These losses may be associated with thermoelastic damping resulting from the interaction between elastic strain and thermal effects. Other losses may also be due to friction at the supports and in-plane flexural vibrations. These surface losses may be reduced with surface treatments which involve coatings. Reducing the coupling between the resonator and surrounding materials can involve isolating shear and moment reactions at the support points and introducing blocking masses to reduce vibration transmitted to the supports.

Figure 4D:
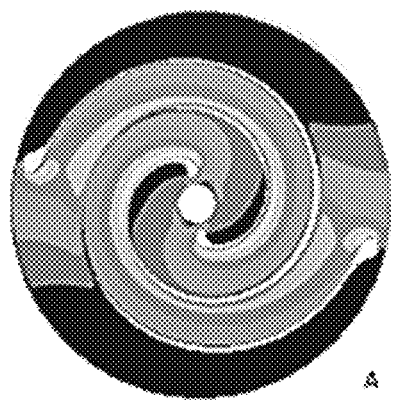
Figure 4D:
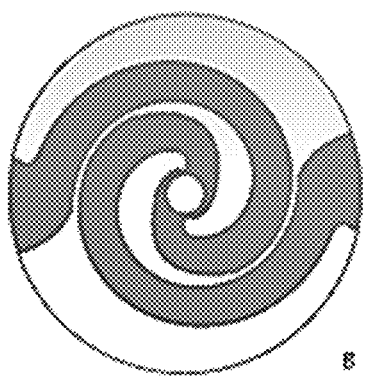

Finite Element Analysis: Computational simulations based on finite element analysis can be used extensively in the design process. FEA will be used during the design optimization approach of the flexure bearings. FEA can also be used to analyze the other components of the OPSLEA, which includes the engine and translator components. The FEA can assist in the topological optimization of geometries. FIG. 4D illustrates an example of topological optimization of a two-arm flexure bearing using ANSYS FEA to maximize strength to weight characteristics. The top image shows the original geometry with stress contours and the bottom image illustrates the optimized design that maximizes stiffness and minimizes weight. In addition to stress analysis, structural FEA analysis provides a means of assessing the deflection of the linear motion in response to a given input. Alignment and radial displacement can be assessed to determine if additional radial supports are needed using explicit dynamic simulations.

Material Selection and Testing: Another aspect of designing the overall lifetime of the structure is to consider information about the materials being used and to use this with FEA to design components for a targeted lifetime. Components that are resonating can be designed for an infinite lifetime or high-cycle fatigue. For example, the structural components may be made of precipitate hardened aluminum or carbon steel. Flexure springs may be made of materials designed for high-cycle fatigue applications. Material testing should be carried out on flexure spring material to ensure correct temper is achieved. Using FEA and knowledge of the stress intensity and the fatigue properties, the temper and alloy of materials can be assessed.

A novel resonant opposed free piston engine generator has been presented comprising an engine with a pair of opposed piston assemblies for providing combustion work or kinetic energy to the reciprocating pistons, a resonant driver system comprising of flexure springs which act as the driver system during the compression stroke and enable high frequency operation, and a pair of electromagnetic machines for generating electrical energy from the kinetic energy of the reciprocating pistons during the power generation mode. The electromagnetic machines can also provide the desired electrical work for reciprocating the piston assemblies during the starting or motoring mode. The multiple component system in this novel design can be controlled using a global control architecture which includes the controls for the engine and combustion systems, resonant systems and/or electromagnetic systems.

An opposed piston synchronized linear engine-alternator (OPSLEA) machine can comprise a cylinder at the center with two pistons opposing each other. The cylinder can constitute the combustion chamber. Opposed piston assemblies can move linearly with the two pistons moving in opposite directions coming close to each other at a combustion chamber of the central cylinder. The opposed piston assembly comprises the two pistons with piston seals and a rod attached to its linear electromagnetic machine. The OPSLEA can include two linear electromagnetic machines designed to convert the mechanical energy from the linear motion of the pistons to electrical energy and a resonant driver mechanism that can provide compression during the compression stroke. Each of the linear electromagnetic machines is attached to the same axis as the piston assembly.

The linear combustion engine can comprise two opposed piston assemblies working synchronously to create a compression ratio high enough to combust gases or a back to back piston assembly controlled to create high compression ratio to combust gases. The compression ratio can be in range higher than 40:1. The combustion of the system can be, e.g., spark ignition or HCCI. Stroke length of the linear engine can be in a range from about 0.5 inch to about 4 inches. The cylinder can comprise intake and exhaust ports appropriate to the stroke length.

The linear electromagnetic machines can work both as a generator as a motor. The linear electromagnetic machines can switch between motoring and generating modes based on variable compression and expansion ratio. Resonant operation of the OPSLEA includes resonant operation of the generator, resonant operation of the engine and resonant operation of the flexure springs. Single point frequency operation of the linear engine can be based on resonance. The fuel used in the linear engine can be natural gas, gasoline or any other combustible fuel. The flexure springs can be gas spring, flexure springs or other appropriate mechanical springs. Resonant operation of the flexure springs provides ease of ability to start the linear electromagnetic machine as a motor. The flexure springs can operate as bearings to the piston assembly or any other linear bearing can be used for each of the pistons. Frequency of operation can be in a range from about 10 Hz to about 120 Hz.

The pistons can be coupled to the linear electromagnetic machine through a shaft along the same axis. The linear electromagnetic machine can be a permanent magnet machine, induction machine or switched reluctance machine or transverse flux machine or a combination of these. The magnet design for a permanent magnet linear electromagnetic machine can be axial or radial type or a Halbach arrangement. The design of the linear electromagnetic machine can be single sided, double sided or tubular arrangement. Startup of the linear engine can be accomplished using the linear electromagnetic machine as a motor. The linear engine comprises an injector into the intake port. The injector injects the fuel into a combustion chamber of the central cylinder. Intake and exhaust ports in the cylinder to allow for exchange of gases.

The linear engine for a two-stroke engine comprises a compression stroke and an expansion stroke. The compression stroke can be provided by the flexure springs. The expansion stroke provided by the combustion of the engine. During the expansion stroke or combustion stroke of the engine, a portion of energy is stored in the springs and portion of energy is converted into electrical energy in the linear electromagnetic machine. Part of the energy stored in the springs provides the compression stroke for the next cycle. This energy overcomes the frictional and vibration losses in the system. The load control can take out appropriate electrical power based on the combustion stroke. Linear sensing technology can be used to determine accurate position information to the order of a micrometer. The intake can be tuned to allow air into the cylinder and the exhaust can be tuned to achieve resonance to return all the exhaust gases back to the cylinder.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.7%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An opposed piston synchronized linear machine, comprising: a linear engine comprising opposed piston assemblies including two pistons that move linearly in opposite directions along a longitudinal axis of a central cylinder, wherein the opposed piston assemblies are synchronously controlled to generate a compression ratio sufficient to combust fuel in a combustion chamber of the central cylinder; first and second linear electromagnetic machines coupled at a proximal end to the piston assemblies, where the first and second linear electromagnetic machines convert linear motion provided by the two pistons to electrical energy in a generating mode, wherein the first and second linear electromagnetic machines are configured to operate in a motoring mode to start the linear engine, the first and second linear electromagnetic machines pulsed to drive the opposed piston assemblies at a resonant frequency to start the linear engine, wherein pulsing of the first and second linear electromagnetic machines is controlled based upon sensed position or velocity of a shaft of a translator of the first or second linear electromagnetic machine; and a resonant driver assembly that provides compression during a compression stroke of the linear engine, the resonant driver assembly comprising springs configured for the resonant frequency.

2. The opposed piston synchronized linear machine of claim 1, comprising a cylinder encasing the linear engine, the first and second linear electromagnetic machines and the resonant driver assembly, wherein the linear engine is substantially centered in the cylinder.

3. The opposed piston synchronized linear machine of claim 1, wherein the first and second linear electromagnetic machines are each connected to one of the two pistons via a rod.

4. The opposed piston synchronized linear machine of claim 3, wherein stroke length of the linear engine is in a range from about 0.5 inches to about 4 inches.

5. The opposed piston synchronized linear machine of claim 1, wherein the springs of the resonant drive assembly comprise at least one flexure spring located at a distal end of each of the first and second linear electromagnetic machines opposite the piston assemblies.

6. The opposed piston synchronized linear machine of claim 5, wherein the springs of the resonant drive assembly further comprise at least one other flexure spring located at the proximal end of each of the first and second linear electromagnetic machines.

7. The opposed piston synchronized linear machine of claim 5, wherein the at least one flexure spring comprises stacked flexure plates configured for the resonant frequency.

8. The opposed piston synchronized linear machine of claim 1, wherein the compression ratio is greater than 40:1.

9. The opposed piston synchronized linear machine of claim 1, wherein combustion of the fuel is by spark ignition or homogenous charge compression ignition (HCCI).

10. The opposed piston synchronized linear machine of claim 1, the fuel is natural gas or gasoline.

11. The opposed piston synchronized linear machine of claim 1, comprising electronic control circuitry coupled to the first and second linear electromagnetic machines, the electronic control circuitry configured to synchronously control the pulsing of the first and second linear electromagnetic machines at the resonant frequency.

12. The opposed piston synchronized linear machine of claim 1, comprising linear position sensors configured to detect linear motion of the opposed piston assemblies and the first and second linear electromagnetic machines.

13. The opposed piston synchronized linear machine of claim 1, wherein the first and second linear electromagnetic machines comprise a permanent magnet machine, induction machine, switched reluctance machine or transverse flux machine.

14. The opposed piston synchronized linear machine of claim 1, comprising at least one linear bearing configured to constrain a translator within a stator assembly of the first or second linear electromagnetic machine.

15. The opposed piston synchronized linear machine of claim 14, wherein the at least one linear bearing utilizes the piston to constrain the translator.

16. The opposed piston synchronized linear machine of claim 14, wherein the translator comprises an open frame configured to reduce wind resistance during oscillation.

* * * * *